(12) United States Patent
Caux et al.

(10) Patent No.: US 9,441,279 B2
(45) Date of Patent: Sep. 13, 2016

(54) MAPLE OR BIRCH WATER EVAPORATOR SYSTEM

(71) Applicant: TOLE INOX INC., Princeville (CA)

(72) Inventors: Jocelyn Caux, La Pocatiere (CA); Michel Bochud, La Pocatiere (CA)

(73) Assignee: TOLE INOX INC., Princeville (CA)

( * ) Notice: Subject to any disclaimer, the term of this patent is extended or adjusted under 35 U.S.C. 154(b) by 0 days.

(21) Appl. No.: 14/859,517

(22) Filed: Sep. 21, 2015

(65) Prior Publication Data

US 2016/0010164 A1     Jan. 14, 2016

Related U.S. Application Data

(62) Division of application No. 13/435,973, filed on Mar. 30, 2012, now Pat. No. 9,161,558.

(60) Provisional application No. 61/470,581, filed on Apr. 1, 2011.

(51) Int. Cl.
| | |
|---|---|
| *A23L 1/09* | (2006.01) |
| *C13B 25/00* | (2011.01) |
| *B01D 1/14* | (2006.01) |
| *B01D 1/28* | (2006.01) |

(52) U.S. Cl.
CPC ............... *C13B 25/001* (2013.01); *A23L 1/09* (2013.01); *B01D 1/14* (2013.01); *B01D 1/28* (2013.01)

(58) Field of Classification Search
CPC ......... A23L 1/09; C13B 25/001; B01D 1/14; B01D 1/28
See application file for complete search history.

(56) References Cited

U.S. PATENT DOCUMENTS 5,772,850 A     6/1998   Morris
9,161,558 B2 *  10/2015  Caux .................... A23L 1/09

FOREIGN PATENT DOCUMENTS

| CA | 281232 | 1/1928 |
|---|---|---|
| CA | 305761 | 6/1929 |
| CA | 430074 | 7/1944 |
| CA | 1269038 | 5/1990 |
| CA | 1339896 | 5/1998 |
| CA | 2193035 | 6/1998 |
| CA | 2017747 | 9/1999 |
| CA | 2308966 | 11/2001 |
| WO | 2008129127 A1 | 10/2008 |

OTHER PUBLICATIONS

Garrett, L.D., Processing Mapple Syrup with a Vapor Compression Distiller: An Economic Analysis, Forest Service Research Paper NE-385, 1977, pp. 1-12.

* cited by examiner

*Primary Examiner* — David A Reifsnyder
(74) *Attorney, Agent, or Firm* — Goudreau Gage Dubuc; Gwendoline Bruneau

(57) ABSTRACT

A system for producing maple syrup or birch syrup from maple or birch water, comprising an evaporating pan under controlled pressure, a condenser immersed in maple or birch water in the evaporating pan, and a compressor, pressurizing vapor generated by evaporation of maple or birch water in the evaporating pan, the condenser directing the pressurized vapor provided by the compressor to the maple or birch water within the evaporating pan, thereby further evaporating the maple or birch water and further generating vapor.

13 Claims, 8 Drawing Sheets

| °BRIX WATER | VOLUMIC RATIO (VOL.WATER/VOL.SYRUP) | ENERGY/IMPERIAL GALLON OF SYRUP | | | ENERGY COST/YEAR | | |
|---|---|---|---|---|---|---|---|
| | | OIL EVAPORATOR ($/GAL.IMP.SYRUP) | PRESENT SYSTEM ($/GAL.IMP.SYRUP) | GAIN ($/GAL.IMP.SYRUP) | OIL EVAPORATOR ($/YEAR) | PRESENT SYSTEM ($/YEAR) | GAIN ($/YEAR) |
| 2 | 43,4 | 24,50$ | 1,08$ | 23,42$ | 44 377$ | 1 951$ | 42 427$ |
| 3 | 28,8 | 16,08$ | 0,71$ | 15,37$ | 29 126$ | 1 281$ | 27 845$ |
| 4 | 21,5 | 11,87$ | 0,52$ | 11,35$ | 21 500$ | 946$ | 20 555$ |
| 5 | 17,2 | 9,34$ | 0,41$ | 8,93$ | 16 918$ | 744$ | 16 173$ |
| 6 | 14,2 | 7,66$ | 0,34$ | 7,32$ | 13 875$ | 610$ | 13 264$ |
| 7 | 12,2 | 6,45$ | 0,28$ | 6,17$ | 11 683$ | 514$ | 11 169$ |
| 8 | 10,6 | 5,55$ | 0,24$ | 5,31$ | 10 053$ | 442$ | 9 611$ |
| 9 | 9,4 | 4,85$ | 0,21$ | 4,64$ | 8 785$ | 386$ | 8 399$ |
| 10 | 8,4 | 4,29$ | 0,19$ | 4,10$ | 7 771$ | 341$ | 7 430$ |
| 11 | 7,6 | 3,83$ | 0,17$ | 3,66$ | 6 937$ | 304$ | 6 633$ |
| 12 | 7,0 | 3,45$ | 0,15$ | 3,31$ | 6 250$ | 255$ | 5 995$ |
| 13 | 6,4 | 3,12$ | 0,14$ | 2,98$ | 5 651$ | 248$ | 5 403$ |
| 14 | 5,9 | 2,84$ | 0,13$ | 2,72$ | 5 144$ | 226$ | 4 918$ |
| 15 | 5,5 | 2,60$ | 0,11$ | 2,49$ | 4 709$ | 206$ | 4 503$ |
| 16 | 5,1 | 2,39$ | 0,11$ | 2,29$ | 4 329$ | 190$ | 4 139$ |
| 17 | 4,8 | 2,21$ | 0,10$ | 2,11$ | 4 003$ | 176$ | 3 827$ |
| 18 | 4,5 | 2,04$ | 0,09$ | 1,95$ | 3 695$ | 163$ | 3 532$ |

Fig-7

MAPLE OR BIRCH WATER EVAPORATOR SYSTEM

CROSS REFERENCE TO RELATED APPLICATIONS

This application is a divisional application of U.S. patent application Ser. No. 13/435,973 filed on Mar. 30, 2012, which itself claims benefit of U.S. provisional application Ser. No. 61/470,581, filed on Apr. 1, 2011, issued into U.S. Pat. No. 9,161,558 on Oct. 20, 2015. All documents above are incorporated herein in their entirety by reference.

FIELD OF THE INVENTION

The present invention relates to a maple or birch water evaporator system.

BACKGROUND OF THE INVENTION

Typically, maple water is transformed into maple syrup in an evaporator, standardly fired by wood, oil or gas. The water is heated until it boils. From the time the maple water is poured into the evaporator to the time it turns into syrup, it undergoes a complex chain of chemical reactions which produce the characteristically maple color and flavor. Typically, around 40 liters of maple water are evaporated to produce 1 liter of syrup. Most of the water in the maple water evaporates during this process, leaving concentrated maple syrup. Maple water has a sugar content comprised between about 1 and 4 Brix, while maple syrup has a sugar content of about 66 Brix.

Generally, the evaporator consists of one or more pans that are placed over a firebox referred to as an arch. The pans are divided into sections to separate the more concentrated maple water from the more dilute. The sections are not closed, so that the maple water can move freely as the water evaporates therefrom. A flat bottomed pan is referred to as the syrup pan or finishing pan. Syrup reaches its final concentration in this pan. Flues in the bottom of the sap pan greatly increase the surface area for heating. Hot gasses from the fire pass between the flues. The flue pan is positioned toward the back of the firebox. The maple water enters the flue pan. The syrup pan is placed over the front of the firebox above grates in a wood fired arch as we see below. The syrup pan and flue pan are connected so that the flow is continuous. The maple water in the pans is about 2 inches deep during active boiling. The amount of steam that rises is substantial.

The evaporation process is highly energy consuming, energy being dissipated mainly as water vapor.

There is a need in the art for a maple water evaporator system.

SUMMARY OF THE INVENTION

More specifically, in accordance with the present invention, there is provided a system for producing maple syrup or birch syrup from maple or birch water, comprising an evaporating pan under controlled pressure; a condenser immersed in maple or birch water in the evaporating pan; and a compressor pressurizing vapor generated by evaporation of maple or birch water in the evaporating pan; wherein the condenser directs the pressurized vapor provided by the compressor to the maple or birch water within the evaporating pan, thereby further evaporating the maple or birch water and further generating vapor.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 7 shows a table presenting simulated cost gains for a sugar bush comprising 10 000 notches, using an evaporator according to the present invention and using a standard oil evaporator.

DESCRIPTION OF EMBODIMENTS OF THE INVENTION

Figure 1:
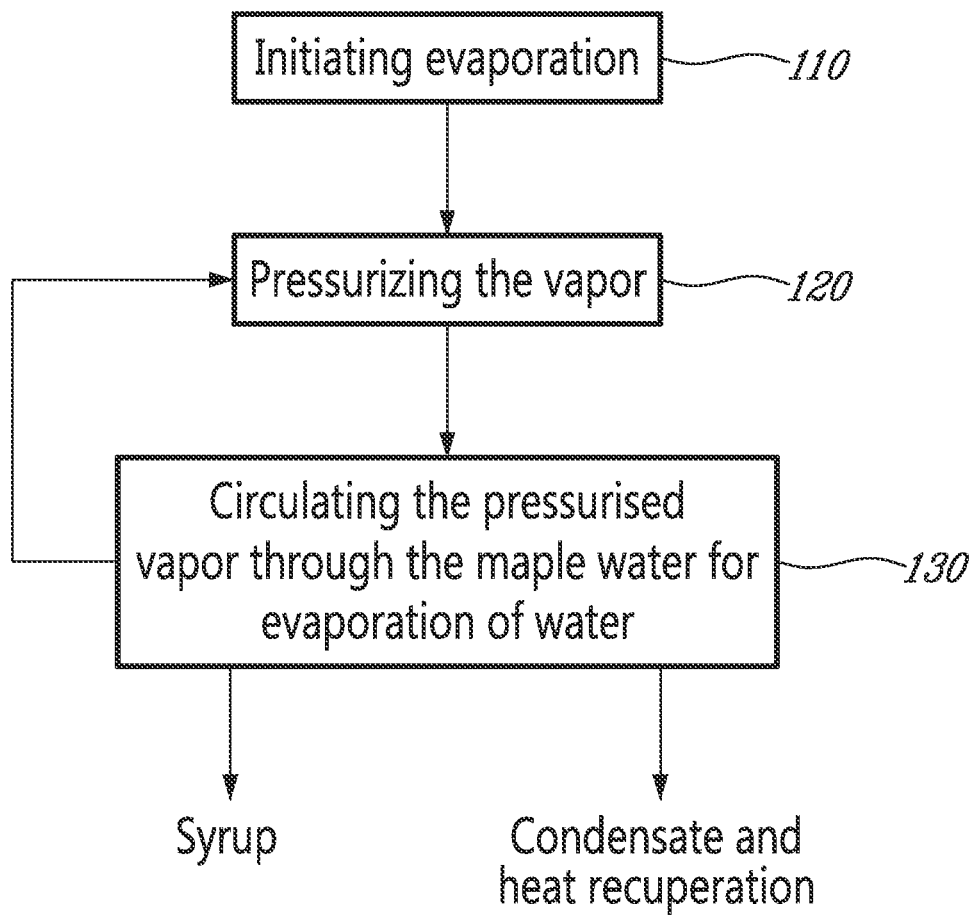
FIG. 1 is a flowchart of a method according to an embodiment of an aspect of the present invention.

FIG. 1 is a flowchart of a method according to an embodiment of an aspect of the present invention. The method generally comprises pressurizing the vapor generated by evaporation of maple water (step 120), and directing the energy of this pressurized vapor to the maple water to an evaporating pan (step 130) for evaporating the water in the maple water present in the evaporating pan, retrieving the vapor generated by evaporation of the water in the maple water present in the evaporating pan and pressurizing this retrieved vapor (step 120), while recuperating a condensate and heat, for production of maple syrup, in a servo-controlled way.

Once the steady state is reached, the main source of energy for evaporation of the maple water is the pressurized vapor, produced by a compressor from the vapor generated by evaporation of the maple water.

An initial heating stage to first get vapor from the maple water may be achieved using an auxiliary heating unit for heating the maple water initially present in the evaporating pan, such as electrical elements or a heat source such as electricity, wood, oil, etc. for example, which typically generate low pressure vapor. In the latter case, the vapor thus first generated is then introduced directly in a condenser to start the process.

Figure 2:
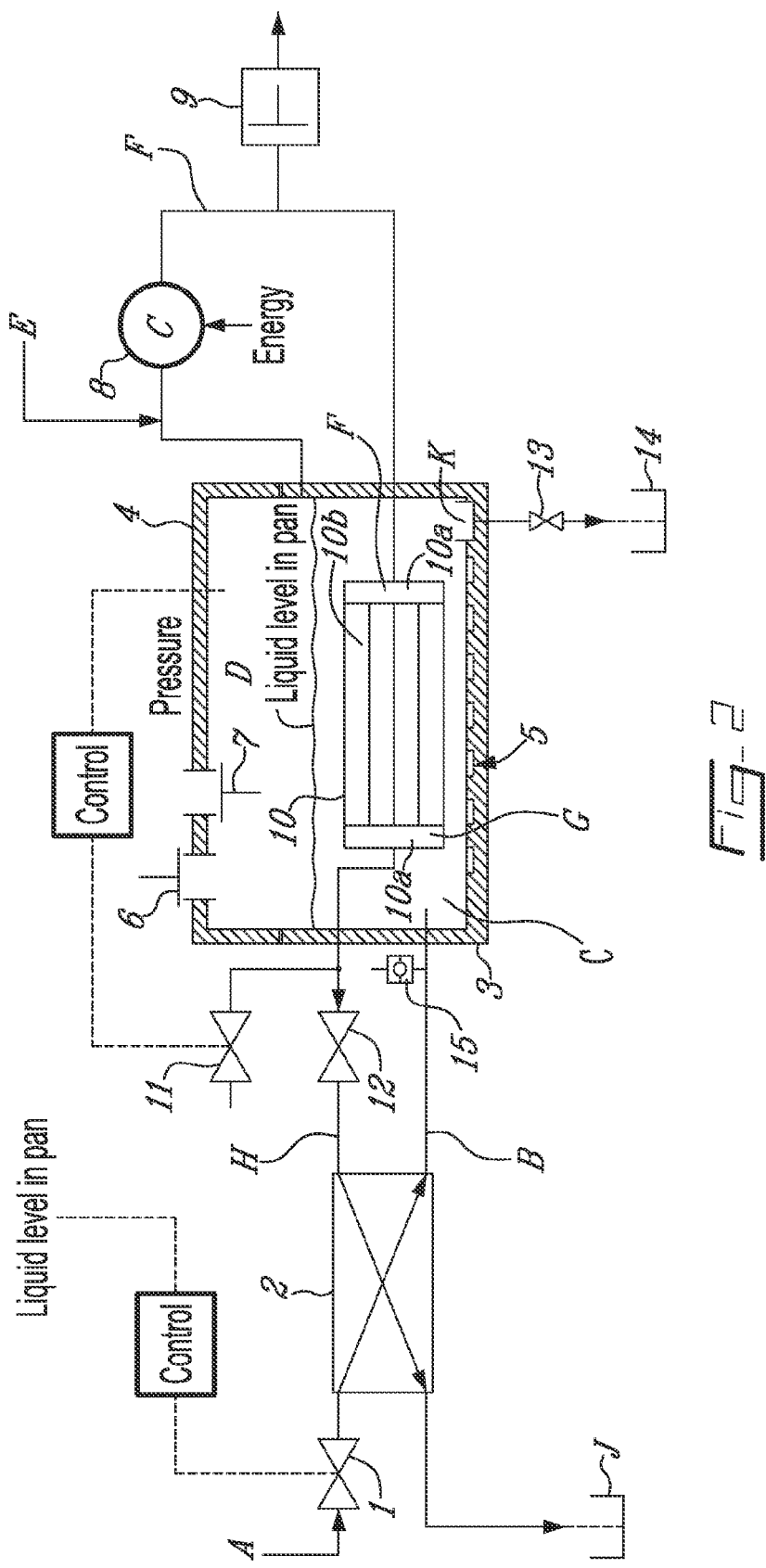
FIG. 2 is a schematical view of a system according to an embodiment of an aspect of the present invention.

As schematically illustrated in FIG. 2, an evaporator system according to an embodiment of an aspect of the invention generally comprises an evaporating pan 3, a compressor 8 and a condenser 10.

Initially, the evaporating pan 3 is filled with maple water up to a predetermined level selected such that the condenser tubings are immerged under the maple water.

Evaporation is first initiated by providing heat to the maple water present in the evaporating pan 3, by using an auxiliary heating unit 5. The auxiliary heating unit 5 is used to rise the temperature of the maple water in the evaporating pan 3 until the pressure in the evaporating pan 3 reaches a predetermined set point, typically between 1 and 5 cm of water above atmospheric pressure. Thus, the auxiliary heating unit 5 first brings the maple water to its boiling temperature so as to first generate vapor needed to start the compressor 8.

The compressor 8 is then started, fed with the vapor thus generated, for mechanically compressing the saturated vapor (D) generated in the evaporating pan 3 into a superheated water vapor (F). As the vapor flow increases in the compressor 8, the pressure in the evaporating pan 3 continues to increase, until it exceeds the predetermined set point, typically between 1 and 5 cm of water above atmospheric pressure as mentioned hereinabove. The heating capacity of the auxiliary heating unit 5 may then be progressively reduced and finally completely stopped. The system is then able to operate on its own, as will now be described.

Once the compressor 8 is started, evaporation of water in the maple water in the evaporating pan 3 is achieved by circulating pressurized vapor, provided by the compressor 8, through manifolds 10a and tubing 10b of the condenser 10, immersed in the evaporating pan 3.

The pressures, both in the evaporating pan 3 and in the condenser 10, are continuously monitored, by pressure controllers such as sensors for example. An adjustable pressure regulating valve 11 is used to control the pressure within the evaporating pan 3 by varying the heat transfer rate delivered by the condenser 10. If the pressure in the evaporating pan 3 reaches a predetermined set point, typically a pressure between 5 and 15 cm of water above atmospheric pressure, the evaporation rate of the system is reduced by lowering the pressure in the condenser 10. On the opposite, if the pressure in the evaporating pan 3 falls below a predetermined set point, typically a pressure between 1 and 8 cm of water above atmospheric pressure, the evaporation rate of the system is increased by increasing the pressure in the condenser 10. Moreover, an over pressure protection 6 and an under pressure protection 7 are provided for the evaporating pan 3, as well as a safety valve 9 at the output of the compressor 8. Different servo-controlled mechanisms may be used to control the pressure in the evaporating pan 3.

Water may be introduced by a nozzle (E) for example (see FIG. 2) just before the inlet of the compressor 8, to reduce vapor superheat before the vapor enters the compressor 8. Since the heat transfer rate is higher when a phase change occurs, water injected by the nozzle (E), in amounts between about 2 and 5% of the main mass flow rate of vapor for example, providing that the vapor at the output of the compressor 8 is practically saturated allows the condensing process to start earlier in the condenser 10, thus maximizing its efficiency.

The surface, the size and the geometry of the condenser 10 are selected to optimize condensation and energy consumption, as will be described hereinbelow.

The difference of temperature between the maple water within the evaporating pan 3 and the surface of the manifolds and tubing of the condenser 10, heated by the compressed vapor circulating through the condenser 10, is monitored, using temperature controllers. Assessing the temperature of the compressed vapor circulating through the condenser 10 by assuming a certain temperature drop through the tubing walls, it is possible to determine the pressure of this compressed vapor circulating through the condenser 10, and thus the required compression ratio of the compressor 8.

The flow of maple water that has to be processed by the system is also monitored, by flow controllers. Knowing the rate of water that has to be evaporated from the maple water to be processed, a mass balance allows determining the flow of vapor that is produced by the boiling maple water. This maple water needs to receive a certain amount of heat flux to be brought to boil. Once the flow of vapor that has to be compressed and the compression ratio, and therefore the compressor size, are selected, the condenser surface is determined as a function of the target heat flux, considering that its surface should be large enough to allow condensation, and reduced enough to be economically reasonable.

The system needs to be highly impervious to prevent contamination of the condenser 10, i.e. to prevent ingress of non-condensable gases within the condenser 10, in order to ensure generation of an air-free pressurized vapor by the compressor. A small amount of steam can be voluntarily and continuously released after the condenser to make sure that non condensable gases are continuously evacuated from the condenser upstream of the compressor.

As mentioned hereinabove, the evaporating pan 3 operates at a moderate pressure of typically a few water centimeters above atmospheric pressure.

Maple water to be treated (A) is introduced into the evaporating pan 3, through a maple water regulation valve 1 and a heat exchanger 2 fed with condensate and vapor from the condenser 10 through the pressure regulating valve 11, as heated maple water (B). The maple water regulation valve 1 may be positioned before or after the heat exchanger 2. In the evaporating pan 3, the heated maple water (B) is brought to boiling maple water (C), and generates water vapor (D), which is directed to the compressor 8 to generate compressed water vapor (F) used, in the condenser 10, to bring the heated maple water (B) to boiling maple water (C), as described hereinabove.

A water/vapor separator 12 may be provided at the output of the evaporating pan 3 to separate water from vapor before entry into the heat exchanger 2, so that the heat exchanger receives only water and the amount of water entering the condenser is reduced as much as possible.

Condensed water (J) may be recovered at an output of the heat exchanger 2, through a drainage valve 12. This cold distilled water may be later reused for cleaning the system for example.

The resulting maple syrup (K) may be recovered in a syrup tank 14 fed from the evaporating pan 3 through a syrup valve 13 for example. At the maple syrup exit (K), at a distance from the condenser 10, typically the maple product in the evaporating is below its ebullition temperature. In order to ensure a balanced syrup outflow through the syrup valve 13, a heating unit may be added at the output (K), so that the temperature of the syrup is higher at the level of the syrup valve 13, and so that the syrup valve 13 opens adequately. Such regulation mechanism may be desired when starting the system for example.

The compressor is powered by a motor, such as an electrical or an internal combustion engine for example. Different types of gas compressors may be used, such as a screw compressor, a scroll compressor, an ejector, blower etc. . . .

Figure 3:
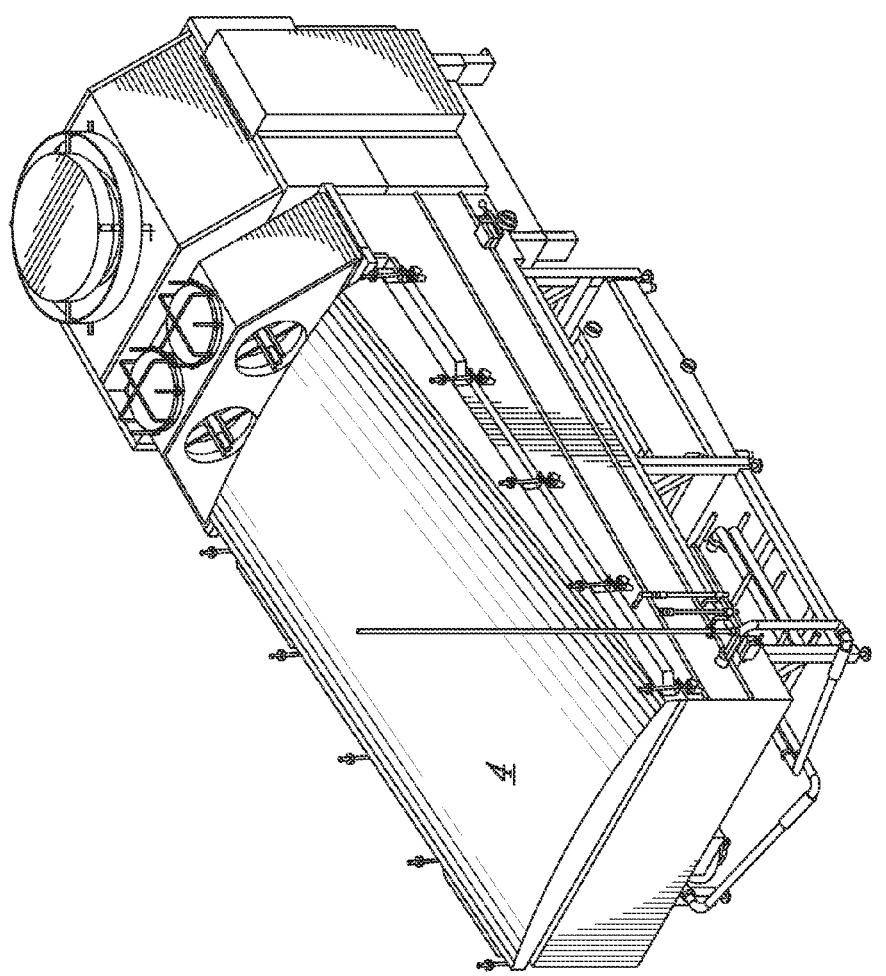
FIG. 3 is a perspective top view of a system according to an embodiment of an aspect of the present invention, with the cover on top of the evaporating pan.
Figure 4:
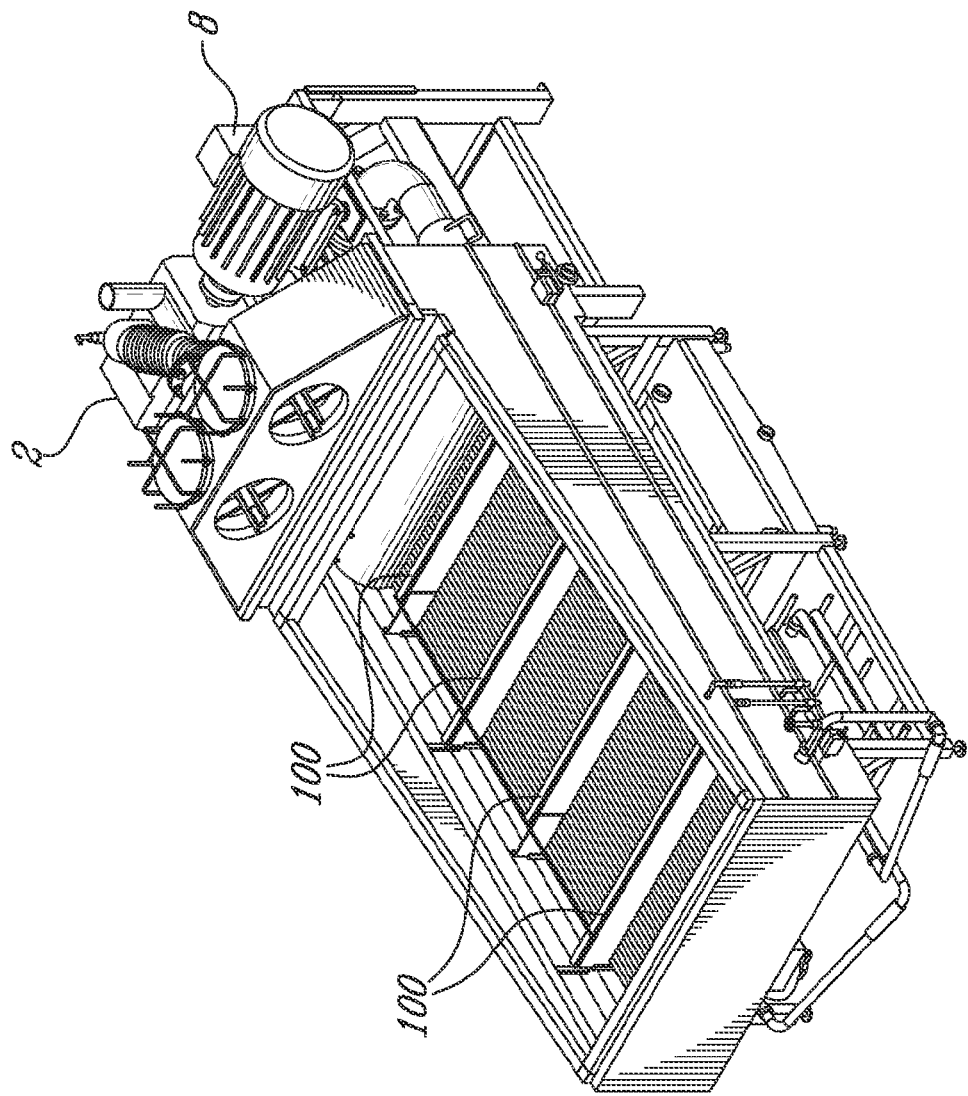
FIG. 4 is a perspective top view of the system of FIG. 3, with the cover removed from the evaporating pan.

The evaporating pan 3 is shown in FIGS. 3 and 4 with a removable impervious cover 4.

Figure 5:
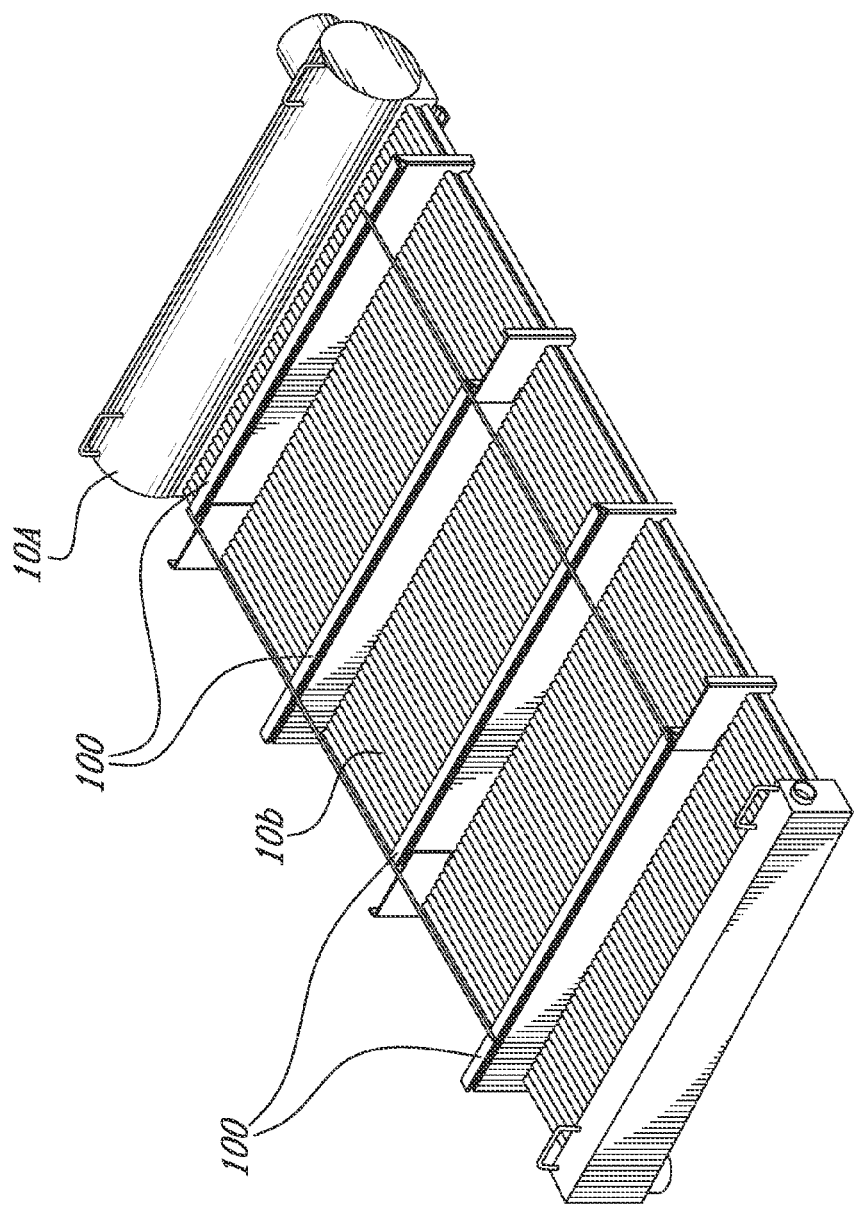
FIG. 5 is a top perspective view of a condenser of a system according to an embodiment of an aspect of the present invention.

As shown in FIG. 5, the removable condenser 10 is positioned inside the evaporating pan 3, typically at the bottom.

FIG. 5 shows the condenser 10, with tubing 10b and manifold 10a.

As the maple water penetrates in the evaporating pan 3, it has a sugar content in an initial range between about 2 and 15 Brix. An inhomogeneous Brix distribution may be desired within the evaporating pan 3, from its input to its outlet, as the syrup concentrates progressively, typically from a sugar content in an initial range between about 2 and 15 Brix to a sugar content of up to 66 Brix. Separating baffles 100, such as stainless steel plates, may be positioned, perpendicularly to the tubings 10b of the condenser 10, to allow stratification of the Brix concentration within the evaporating pan 3, as shown in FIGS. 4 and 5. Such stratification allows a stable regulation of the output valve 13, which is activated in part by the Brix of the outgoing syrup.

Moreover, the bottom of the evaporating pan 3 may be slightly inclined (about ¼ inch to ⅜ inch over the length of the evaporating pan 3 for example) from the inlet of maple water to the outlet of syrup, so that the syrup, denser than the maple water, flows towards the outlet. Inversely, the tubings 10b of the condenser may be slightly inclined towards the opposite direction, so as to assist the condensate water into flowing towards the drainage valve 12 mentioned hereinabove.

An aerator may be provided after the heat exchanger 2 before entry into the evaporating pan 3 to withdraw part of the air contained within the incoming maple water.

In the present system and method, the pressure in the evaporating pan is controlled and maintained around atmospheric pressure, thereby eliminating risks associated with maintaining hot water, typically above 100° C. under pressure as used in typical systems. The condenser contains only a small amount of water (condensed water (G) in FIG. 2) produced in the condenser 10 at any given time, since the condensed water may be immediately eliminated through a valve separating liquid from vapor.

Thus, the present system does not have to sustain high pressure. The present system retrieves vapor, compresses it, and condensates it, in a servo-controlled way so as to maintain a stable pressure. The pressure under the cover 4 of the evaporating pan 3 is maintained slightly above atmospheric pressure so as to prevent ingress of air within the system.

The present method and system generally allow using the energy available as vapor for water maple evaporation, the vapor being generated by the very process of maple water evaporation.

The present system and method use water as the refrigerant fluid. The present system and method allow reaching high coefficients of performances (COPs), i.e. ratio between the energy used in the system for preheating and condensation, over the energy input into the system, typically between 15 and 22.

Figures 6A, 6B:
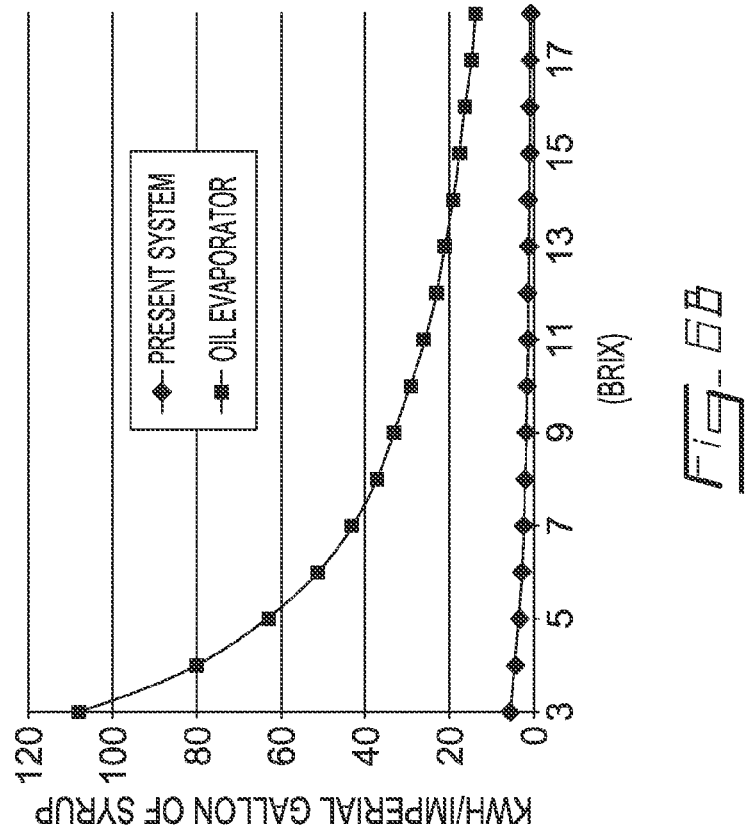
FIG. 6 show a comparison of energy used per volume of maple syrup produced as a function of the Brix of the maple water entering the system, with a system according to the present invention and with a standard oil evaporator as known in the art: A) table of results; B) graph.

FIG. 6 shows a comparison between the performances of an evaporator according to the present invention and a standard oil evaporator as known in the art, based on the amount of energy required (kWh) to produce an imperial gallon of maple syrup as a function of the amount of sugar in the maple water entering the evaporator (Brix), considering a calorific value of oil of 155 890 BTU/imperial gallon, an overall efficiency of the oil evaporator of 74%, 13.25 lb/gallon of syrup, and 3412.9 BTU/kWh.

The COP of the system is slightly dependent on the Brix of the maple water entering the evaporator, since the efficiency of the condenser varies with the viscosity of the liquid. For example, with a maple water entering the evaporator having a Brix of 2, the COP may be 19, while with a maple water entering the evaporator having a Brix of 8, the COP may be lower, for example 15. With oil evaporators of the prior art, as shown the graph of FIG. 6B, the energy used per volume of syrup is much more dependent on the Brix of the maple water entering the evaporator than with a system of the present invention. For an initial Brix of about 8, the present system reaches a COP of about 14-15, in contrast to a COP of about 0.7 for oil evaporators (about 70% efficiency). For an initial Brix of about 2, the present system reaches a COP of up to 20. By increasing the surface of the condenser, COPs of up to 22 may achieved. Even with higher Brix values of maple water entering the evaporator, the present system allows COPs at least 21 times higher than standard evaporators using oil, wood, granules or other combustibles.

FIG. 7 shows a table presenting simulated cost gains for a sugar bush comprising 10 000 notches each producing 2.4 lb of maple syrup, based on a calorific value of oil of 155 890 BTU/imperial gallon, an overall efficiency of the oil evaporator of 74%, a price of 1.25 CAD/l for oil, a price of 0.10 CAD/kWh for electricity, and assuming 13.25 lb/gallon of syrup.

Figure 8:
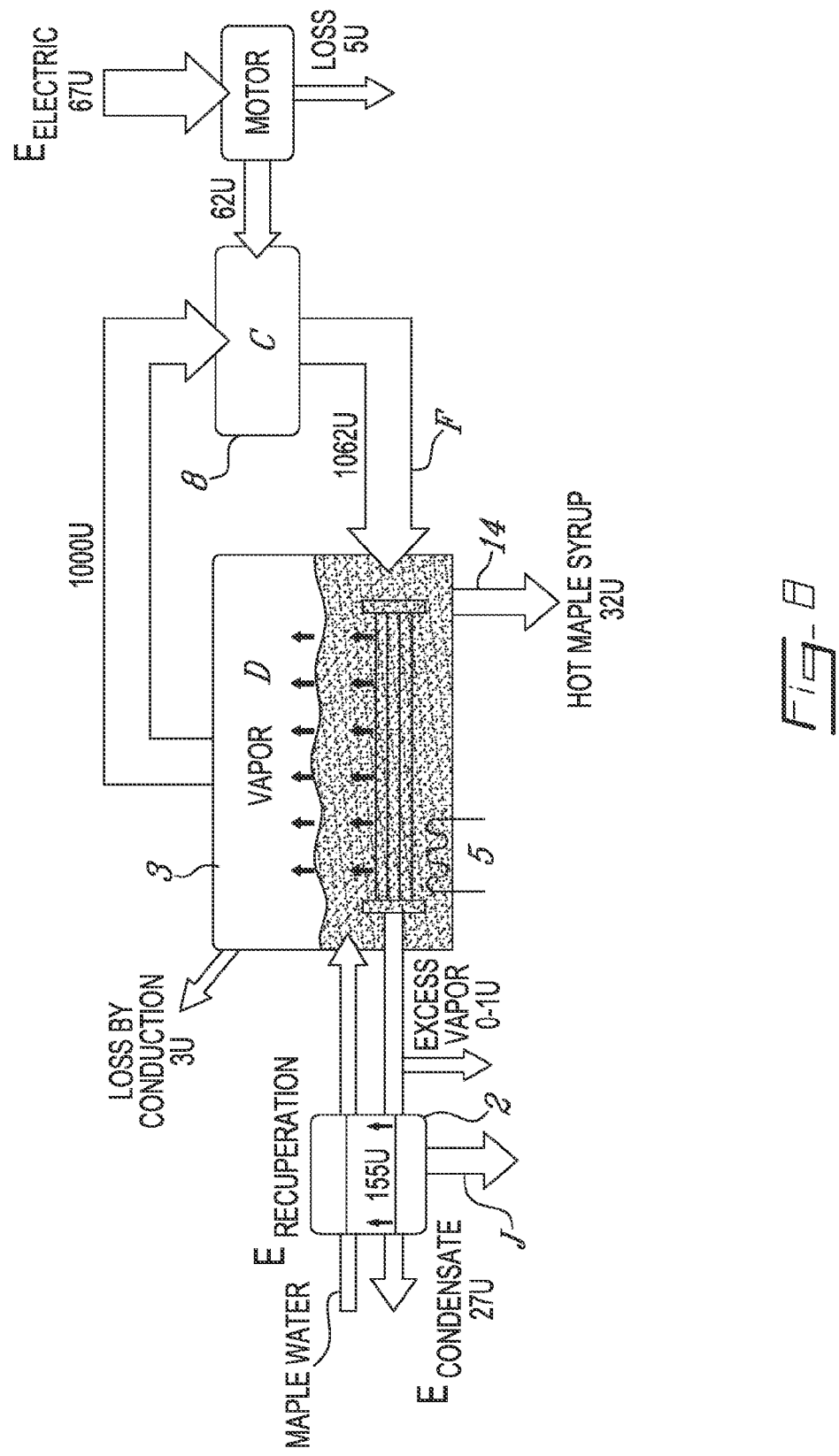
FIG. 8 schematically shows the use of vapor generated by evaporation of water in the maple water, according to an embodiment of the present invention.

As summarized in FIG. 8, the vapor above the evaporating pan is saturated and at a pressure close to atmospheric pressure, i.e. at a temperature of 100° C., the slight overpressure produced by the cover on the evaporating pan ensuring purity, i.e. low air content, of the vapor, for an efficient heat transfer by the condenser and an optimized performance of the compressor. This vapor is pressurized to about 1.4 atm, i.e. to a temperature of about 108° C. When forced through the tubings of the condenser, which are immersed in the maple water in the evaporating pan, this pressurized vapor gets oversaturated since the temperature of the tubings is a little bit lower. The vapor then condensates on the walls of the tubings, thereby transferring condensation energy to the water in the evaporating pan, which thus boils and generates vapor, which is recuperated by the condenser. The energy of the vapor which escapes from the evaporating pan (condensation enthalpy) compensates for the energy needed for evaporation. it is estimated that the losses of energy are as follows: for 1000 units (1000 U) of energy recuperated from the vapor, there may be about 5 U loss to the motor, about 3 U lost by thermal conduction through the walls of the evaporating pan, 27 U lost through the condensation water (condensate) that leaves the system at a temperature above the temperature of the incoming maple water (for example the incoming maple water is at 2° C. and the condensate is at 12° C.) and 32 U are lost in the hot syrup, which energy is not recovered, the syrup being filtered and bottled when hot. Those energy losses (67 U) are compensated an energy $E_{electric}$, input, to the motor for example.

As people in the art will appreciate, the present method and system may be used in combination with reverse osmosis. Reverse osmosis may be used to preconcentrate the maple water, i.e. to reduce the amount of water therein, to reach a sugar content comprised between about 6 and 18 Brix for the maple water entering the evaporator (A).

As the present system and method allow controlling overheating, caramelization of the maple syrup is prevented and the produced maple syrup has an optimized content of syringaldehyde, origin of the characteristic maple savor.

Although the present invention has been described hereinabove by way of embodiments thereof, it may be modified, without departing from the nature and teachings of the subject invention as described herein.

What is claimed is:

1. A system for producing maple syrup or birch syrup from maple or birch water, comprising:
    an evaporating pan comprising an impervious cover, a maple or birch water inlet, and a maple syrup or birch syrup outlet;
    a compressor, adapted for pressurizing vapor generated by evaporation of the maple or birch water in said evaporating pan;
    a condenser comprising at least one tubing immerged under the maple or birch syrup within the evaporating pan; and
    a pressure controller controlling a pressure within the evaporating pan;
    wherein an auxiliary heating unit initially brings the maple or birch water in said evaporating pan to a boiling temperature so as to first generate vapor needed to start the compressor; said at least one tubing circulates the pressurized vapor provided by said compressor to the maple or birch water within the evaporating pan, thereby further evaporating the maple or birch water and further generating vapor, and said pressure controller controls a pressure within the evaporating pan around atmospheric pressure.

2. The system of claim 1, comprising a water nozzle before an inlet to said compressor.

3. The system of claim 1, comprising temperature controllers, said temperature controllers monitoring a temperature difference between the maple or birch water within the evaporating pan and walls of the condenser.

4. The system of claim 1, comprising a flow controller, said flow controller monitoring the flow of the maple or birch water within the evaporating pan.

5. The system of claim 1, wherein the surface of the condenser is selected according to a target heat flux.

6. The system of claim 1, comprising non condensable gases evacuation upstream of the compressor.

7. The system of claim 1, wherein said evaporating pan operates at a pressure of a few water centimeters above atmospheric pressure.

8. The system of claim 1, wherein said evaporating pan operates at a pressure comprised in a range between about 1 and 15 cm of water above atmospheric pressure.

9. The system of claim 1, comprising a heat exchanger, said heat exchanger receiving condensate and vapor from the condenser, the maple or birch water going through said heat exchanger before being introduced into said evaporating pan by said maple or birch water inlet as heated maple or birch water.

10. The system of claim 9, comprising a water/vapor separator at an output of the evaporating pan to separate water from vapor before entry into said heat exchanger.

11. The system of claim 9, comprising an aerator after the heat exchanger upstream of the evaporating pan.

12. The system of claim 1, wherein said tubing is in an inclined position from the maple syrup or birch syrup outlet to the maple or birch water inlet of the evaporating pan.

13. The system of claim 1, wherein a bottom surface of said evaporating pan is inclined from the maple or birch water inlet to the maple syrup or birch syrup outlet.

* * * * *